US006421489B1

(12) United States Patent
Berkey et al.

(10) Patent No.: US 6,421,489 B1
(45) Date of Patent: Jul. 16, 2002

(54) WAVEGUIDE PROFILE FOR LARGE EFFECTIVE AREA

(75) Inventors: George E. Berkey, Pine City; Yanming Liu, Horseheads, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/530,018
(22) PCT Filed: Oct. 6, 1998
(86) PCT No.: PCT/US98/21273
§ 371 (c)(1),
(2), (4) Date: Apr. 21, 2000
(87) PCT Pub. No.: WO99/22257
PCT Pub. Date: May 6, 1999

Related U.S. Application Data
(60) Provisional application No. 60/063,442, filed on Oct. 29, 1997.

(51) Int. Cl.⁷ .................................................. G02B 6/02
(52) U.S. Cl. ......................... 385/123; 385/126; 385/127
(58) Field of Search .................................. 385/123–128

(56) References Cited

U.S. PATENT DOCUMENTS

| 5,675,688 A | 10/1997 | Nouchi et al. ............... 385/124 |
| 5,675,690 A | 10/1997 | Nouchi et al. ............... 385/127 |
| 5,721,800 A | 2/1998 | Kato et al. ................... 385/127 |
| 5,822,488 A | * 10/1998 | Terasawa et al. ........... 385/127 |
| 5,852,701 A | 12/1998 | Kato et al. ................... 385/127 |
| 6,072,929 A | 6/2000 | Kato et al. ................... 385/123 |

FOREIGN PATENT DOCUMENTS

| EP | WO 97/33188 | 9/1997 |
| EP | 0779 524 | 12/1998 |

OTHER PUBLICATIONS

P. Nouchi et al., New Dispersion Shifted Fiber with Effective Area Larger Than 90$\mu$m², 22$^{nd}$ European Conference on Optical Communications, Sep., 1996.
V.A. Bhagavatula, et al., Dispersion–Shifted Single–Mode Fiber for High–Bit–Rate and Multiwavelength Systems, Optical Fiber Communication, Feb. 26–Mar. 3, 1995.

* cited by examiner

Primary Examiner—Rodney Bovernick
Assistant Examiner—Juliana K. Kang

(57) ABSTRACT

Disclosed is a single mode optical waveguide fiber having a segmented core design. The core may have two or more segments. The highest refractive index portion of the core is spaced apart from the centerline of the waveguide fiber. The relative index of the first or center segment of the core is negative, where the reference refractive index is taken to be the minimum index clad. This family of core profiles provides effective areas in the range of 110 $\mu$m² to 150 $\mu$m² in the operating window around 1550 nm.

19 Claims, 2 Drawing Sheets

WAVEGUIDE PROFILE FOR LARGE EFFECTIVE AREA

This application is a 371 of PCT/US98/21273, filed Oct. 6, 1998, which claims benefit of 60/063,442, filed Oct. 29, 1997.

BACKGROUND OF THE INVENTION

The invention is directed to a single mode optical waveguide fiber having a large effective area. The large effective area is achieved using a low refractive index core center region surrounded by an annular region of relatively high refractive index.

Recently the effort to provide very high performance waveguide fibers, i.e., waveguides suited to very high data rate telecommunication systems having large regenerator spacing, has focused on waveguide cores having compound refractive index profiles. Examples of such compound cores are found in U.S. Pat. No. 5,613,027, Bhagavatula (the '027 patent).

In the '027 patent a family of core refractive index profiles was disclosed which was characterized by a maximum relative refractive index, Δ%, spaced apart from the centerline of the waveguide fiber. The family of profiles provided exceptional properties well suited to high performance telecommunication systems. In addition, it was noted that certain members of the core profile family were simple in design and thus easier to manufacture and more cost effective. An embodiment in the '027 patent comprised a core having a central core region in which the refractive index was lower than that of the clad layer of the waveguide fiber.

Some recent work by Nouchi et al., ECOC 1996, Oslo and IWCS Proceedings, pages 939–945, 1996, examined this low refractive index central region embodiment and reported effective area in the range of about 60 $\mu m^2$ to 100 $\mu m^2$ and good bend resistance. However, the work does not address the question of optimum placement of the zero dispersion wavelength and cut off wavelength.

The invention disclosed and described in this specification does consider the fuller range of waveguide fiber properties while providing effective areas well in excess of 100 $\mu m^2$ and bend resistance comparable to that of standard step index single mode waveguide fiber.

Definitions

The effective area, $A_{\mathit{eff}}$, is $$A_{\mathit{eff}} = 2\pi (\int E^2 \, r \, dr)^2 / (\int E^4 \, r \, dr),$$

where the integration limits are 0 to 8, and E is the electric field associated with the propagated light. An effective diameter, $D_{\mathit{eff}}$, may be defined as, $$A_{\mathit{eff}} = \pi (D_{\mathit{eff}}/2)^2.$$

The term Δ%, represents a relative measure of refractive index defined by the equation, $$\Delta\% = 100 \times (n_1^2 - n_2^2)/2n_1^2,$$

where $n_1$, is the maximum refractive index in a first region and $n_2$ is the refractive index in a reference region which is usually taken to be the cladding region.

The term refractive index profile or simply index profile is the relation between Δ%, or refractive index, and radius over a selected portion of the core. The beginning and end point of the selected segment may be described by widths or by radii referenced to the waveguide fiber centerline.

The term alpha profile refers to a refractive index profile which follows the equation, $$n(r) = n_0(1 - \Delta[r/a]^\alpha)$$

where r is radius, Δ is defined above, a is the last point in the profile, r is chosen to be zero at the first point of the profile, and α is an exponent which defines the profile shape. Other index profiles include the shapes such as a step, a trapezoid, and a rounded step, in which the rounding may be due to dopant diffusion in regions of rapid refractive index change.

The bend resistance of a waveguide fiber is expressed as induced attenuation under prescribed test conditions. A bend test referenced herein is the pin array bend test which is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

SUMMARY OF THE INVENTION

A focused study of the profiles of U.S. Pat. No. 5,613,027, Bhagavatula, has resulted in the identification of a sub-set of the profiles of the '027 patent which display exceptional properties well suited to high performance telecommunications systems. The sub-set of profiles which are the subject of this application are especially advantageous because they are among the simplest of the profiles of the '027 patent.

A first aspect of the novel single mode waveguide refractive index profile comprises a core region surrounded by a clad layer. The core has two segments, a first circular segment centered on the long axis of the waveguide and an abutting annular segment. Each segment is characterized by an index profile, a relative index, Δ%, and a radius or width. Throughout this document the relative index is defined in terms of the reference index, $n_c$, which is the minimum index of the clad layer. The first segment has a relative index, $\Delta_1$ % in the range of about −0.05% to −0.60% and a radius in the range of about 1 $\mu$m to 5 $\mu$m. The second segment has a relative index in the range of about 0.5% to 1.6% and a width in the range of about 1 $\mu$m to 20 $\mu$m. This width is measure from $r_1$ to the last point of the second segment.

The refractive index profiles of the first or second segment may have different shapes such as a step, a rounded step, an -profile, a trapezoid, or a triangle. In general, for any combination of profiles, Δ %'s and radii can be found to provide the required fiber properties. Because the first segment has a negative refractive index relative to the reference index, $n_c$, which is the minimum index of the clad layer, the first segment profiles will be inverted relative to the second segment profiles.

Embodiments of this first aspect which include a second segment profile of a step, a triangle, and a trapezoid are presented in detail below.

The waveguide properties provided by the novel refractive index profile are effective area, $A_{\mathit{eff}}$, greater than 100

$\mu m^2$, total dispersion slope in the range of about 0.07 to 0.1 ps/nm$^2$-km, mode field diameter in the range of about 8 $\mu m$ to 10 $\mu m$, and cut off wavelength in the range of 1500 nm to 2000 nm. This cut off is measured for waveguide fiber in the uncabled state. The cabling process typically reduces cut off wavelength by about 400 nm to 450 nm so that the novel waveguide is single mode in the wavelength range 1000 nm to 1600 nm. The waveguide could of course be tailored to have a different cut off wavelength.

For wavelength division multiplexing applications, especially in systems which use optical amplifiers, it is advantageous to place the zero dispersion wavelength outside the operating window in the range of about 1530 nm to 1560 nm. The novel index profile provides for such zero dispersion wavelengths as is seen in the data tables below.

In a second aspect of the invention an additional or third segment may be added to the profile to improve bending and mircobending performance of the waveguide without effecting the ability of the refractive index profile to meet the functional requirements noted above. The third segment has a negative relative index, $-\Delta_3$ %, in the range of about $-0.05\%$ to $-0.6\%$ and a width, $w_3$, measured from the last point of the second segment to the last point of the third segment, in the range of about 1 $\mu m$ to 20 $\mu m$. The ranges on the parameters of the first and second segments remain as set forth above. As before, the first or second segment may have different shapes such as a step, a rounded step, an $\alpha$-profile, a trapezoid, or a triangle.

Another embodiment of this second aspect includes a fourth ring of positive relative index, similar to the second ring and a fifth ring of negative relative index similar to the first or third ring.

DETAILED DESCRIPTION OF THE INVENTION

The single mode waveguide fiber profile described herein combines simplicity of form with advantageous operating properties. What has been achieved in this invention is a waveguide fiber profile which is easy to manufacture but which limits non-linear effects by providing large effective area. The larger effective area is achieved with essentially no degradation of bending and microbending performance.

A significant factor in simplifying the manufacturing of the fiber is a process developed specifically for the manufacture of waveguide fibers having a center profile of negative relative index percent in which the reference refractive index is the minimum index of the clad layer. This process, which includes the insertion of a fluorine doped glass rod into a soot preform, is disclosed in co-pending provisional application Ser. No. 60/063,441 which was filed on the same day as the present application. The pertinent parts of that application are incorporated herein by reference.

Figure 1:
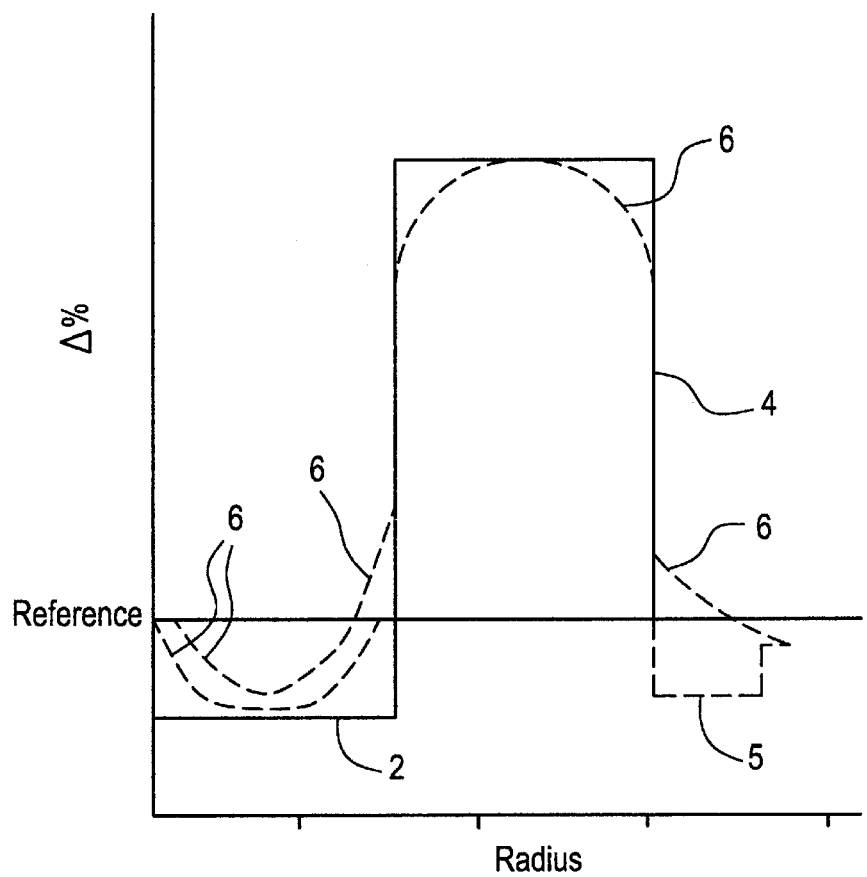
FIG. 1 is a chart of relative index percent vs. radius illustrating a step index profile and variations thereof.

The step index embodiment of the invention is illustrated in the relative index percent, $\Delta$ %, vs. radius chart of FIG. 1. The main features of the chart are the negative relative step index 2 centered on the waveguide centerline surrounded by the positive step index annular region 4. Dashed lines 6 show alternative shapes for the index profiles 2 and 4. The negative relative index annular region illustrated by dashed line 5 shows the optional third core region having a negative relative index, using the minimum clad index as the reference index.

Figure 2:
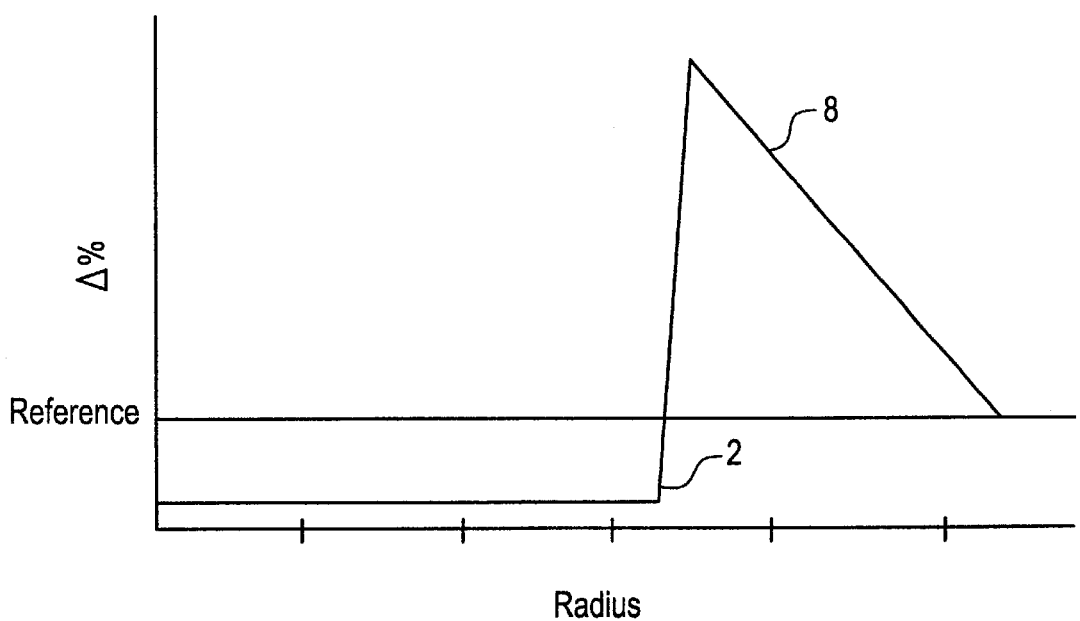
FIG. 2 is a chart of relative index percent vs. radius illustrating a triangular index profile.
Figure 3:
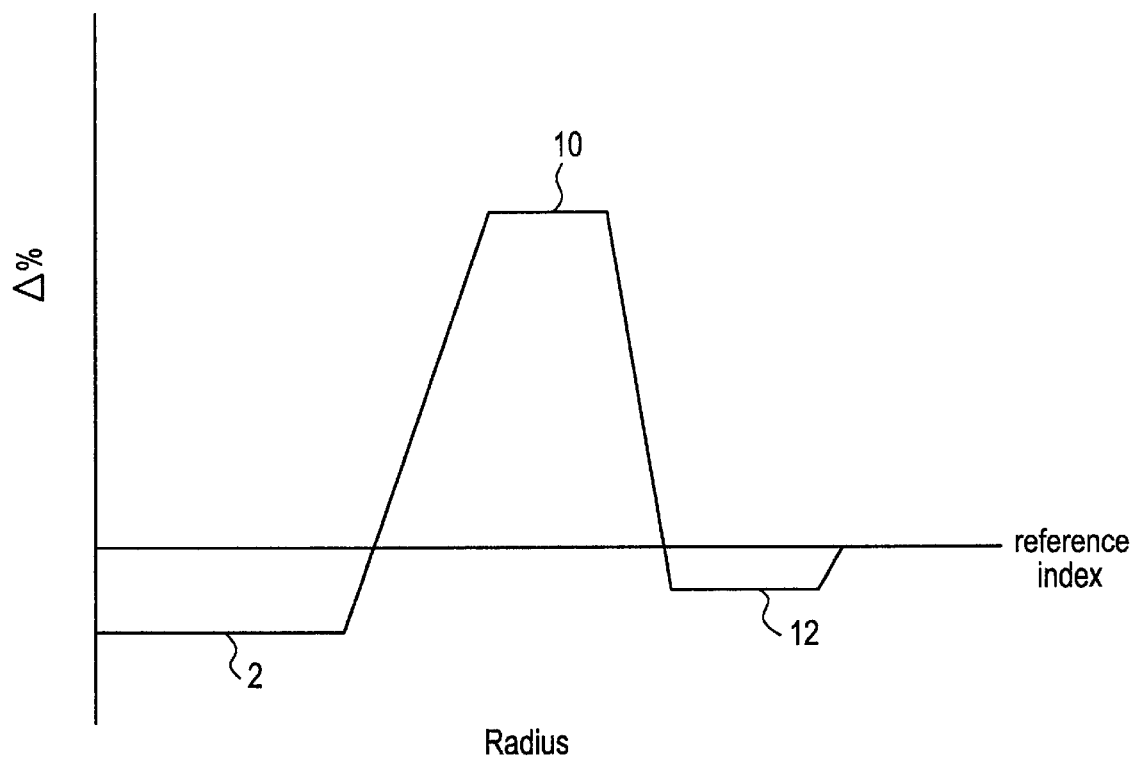
FIG. 3 is a chart of relative index percent vs. radius illustrating a trapezoidal index profile together with an optional third profile segment.

Alternative embodiments of the invention are illustrated in FIGS. 2 and 3. In FIG. 2, the negative relative index region 2 is surrounded by an annulus of triangular cross section 8. The chart of relative index vs. radius shown in FIG. 3 illustrates a first trapezoidal segment 2 having a negative relative index, a second trapezoidal segment 10 having a positive relative index, and a third, optional, trapezoidal segment 12 having a negative relative index. As was noted previously, the optional third segment would typically be included in waveguide fibers requiring high resistance to micro-bending and bending.

Waveguide fibers in accordance with the disclosed invention have been manufactured. A profile of one such waveguide is shown as curve 14 in FIG. 4. The first segment or center portion 18 of the profile of FIG. 4 has a considerable deviation from flatness. This is indicative of the variance in shape which is encompassed in the invention. Likewise, the second segment 20 is seen to have rounded top and bottom portions which indicates that the rounded step shape is appropriate for practicing the invention. The width 24 of second segment 20 is found by extrapolating the sides of the rounded shape to the horizontal axis as is shown by dashed lines 22.

The effect of the lower relative index in the center region of the core is to shift outwardly from the center the light energy carried by the waveguide. This energy shift is shown by the field intensity curve 16.

Example Step Profile

TABLE 1

| $\Delta_1$ % | $r_1$ | $\Delta_2$ % | $w_2$ | $\lambda_o$ | Slope | MFD | $A_{eff}$ | $\lambda_c$ (LP$_{11}$) | PA |
|---|---|---|---|---|---|---|---|---|---|
| −.5 | 2.8 | .78 | 1.9 | 1513 | .077 | 8.45 | 125 | 1857 | 6.2 |
| −.5 | 2.9 | .88 | 1.7 | 1548 | .08 | 8.13 | 121 | 1868 | 4.6 |
| −.4 | 3.5 | .80 | 1.5 | 1508 | .08 | 8.74 | 139 | 1911 | 4.2 |
| −.3 | 3.4 | .8 | 1.6 | 1523 | .076 | 8.43 | 148 | 1966 | 14 |
| −.5 | 3.1 | .93 | 1.6 | 1568 | .082 | 8.1 | 125 | 1894 | 5.2 |
| −.5 | 3.2 | .93 | 1.6 | 1570 | .082 | 8.0 | 129 | 1913 | 5.5 |
| −.45 | 3.4 | .93 | 1.6 | 1567 | .082 | 8.0 | 135 | 1960 | 4.1 |
| −.4 | 3.3 | .98 | 1.5 | 1570 | .085 | 8.0 | 127 | 1938 | 3.4 |
| −.35 | 3.4 | 1.03 | 1.3 | 1569 | .089 | 8.3 | 134 | 1865 | 10.6 |

TABLE 1-continued

| $\Delta_1$ % | $r_1$ | $\Delta_2$ % | $w_2$ | $\lambda_o$ | Slope | MFD | $A_{eff}$ | $\lambda_c$ (LP$_{11}$) | PA |
|---|---|---|---|---|---|---|---|---|---|
| −.3 | 3.3 | 1.08 | 1.3 | 1570 | .09 | 8.04 | 123 | 1910 | 2.6 |
| −.3 | 3.4 | 1.08 | 1.3 | 1572 | .09 | 8.03 | 125 | 1930 | 2.6 |
| −.3 | 3.8 | 1.08 | 1.2 | 1573 | .091 | 8.4 | 147 | 1910 | 14.2 |

Symbols in Table 1 not defined in this document are:
$\lambda_o$, the zero dispersion wavelength in nm;
MFD, the mode field diameter using the Petermann II definition in microns;
$\lambda_c$, the calculated cut off wavelength in nm of the LP$_{11}$ mode; and,
PA, the pin array attenuation in dB.

The values shown in Table 1. are calculations of the properties of a number of embodiments of the novel profile. Note the high effective area, high MFD and relatively low pin array bend attenuation. The design changes which move the value of $\lambda_o$ are also apparent from Table 1. Tables such as these allow one to select waveguide parameters which yield the desired properties.

Figure 4:
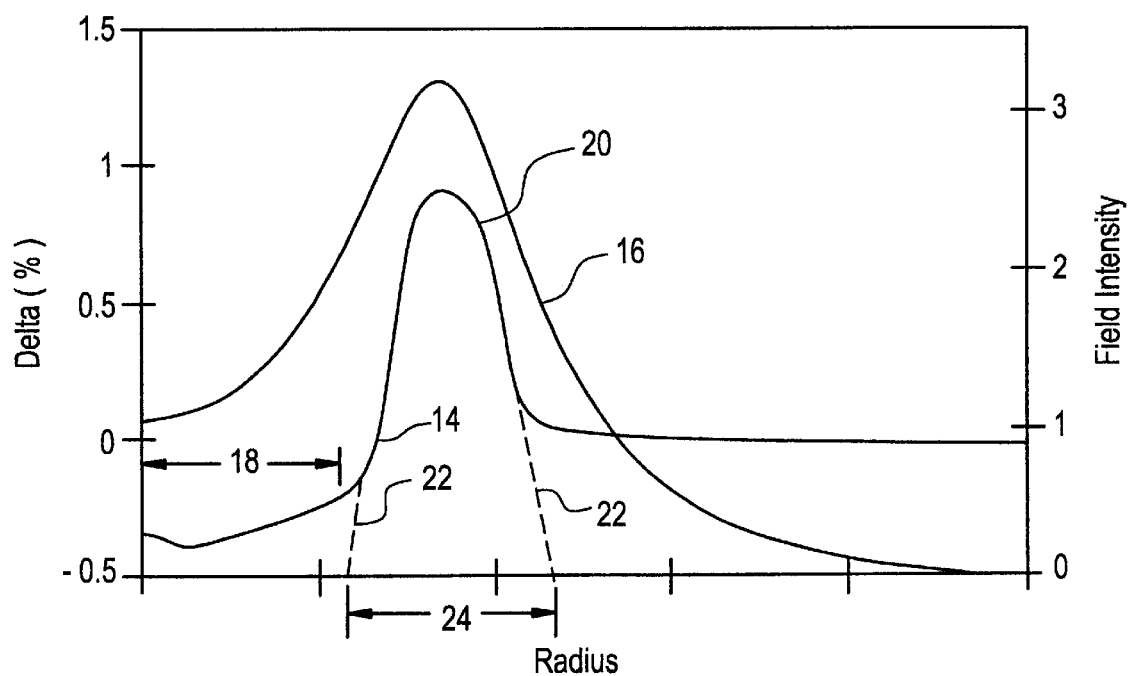
FIG. 4. is a measurement of the relative index percent and the propagated field intensity vs. radius for a single mode waveguide made in accordance with the invention.

For the actual profile shown in FIG. 4, the waveguide measured and predicted properties are shown in Table 2.

TABLE 2

| Property | Predicted | Measured |
|---|---|---|
| $\lambda_o$ nm | 1500–1600 | 1500–1584 nm |
| Slope ps/nm$^2$-km | 0.06–0.10 | 0.07–0.10 |
| $A_{eff}$ $\mu$m$^2$ | 80–150 | 55–120 |
| PA loss dB | 1–12 | 2.3–5.4 |

The predicted and measured properties show good agreement, especially in light of the many process steps included in the waveguide manufacturing process.

Example Triangular Profile

TABLE 3

| $\Delta_1$ % | $r_1$ | $\Delta_2$ % | $w_2$ | $\lambda_o$ | Slope | MFD | $A_{eff}$ | $\lambda_c$ | PA |
|---|---|---|---|---|---|---|---|---|---|
| −.5 | 2.7 | 1.35 | 2.3 | 1533 | .081 | 8.21 | 110 | 1807 | 3.25 |
| −.5 | 2.8 | 1.2 | 2.5 | 1509 | .078 | 8.6 | 123 | 1808 | 7.8 |
| −.45 | 2.9 | 1.25 | 2.4 | 1514 | .080 | 8.52 | 123 | 1836 | 5.4 |
| −.4 | 3.1 | 1.25 | 2.3 | 1513 | .081 | 8.7 | 131 | 1840 | 9.45 |
| −.3 | 3.4 | 1.3 | 2.1 | 1510 | .083 | 8.9 | 140 | 1850 | 3.7 |

The values displayed in Table 3. show the effectiveness of the novel segmented core design in providing optical waveguide fiber for high performance telecommunications systems.

Although specific embodiments of the invention have been herein disclosed and described, the invention is nonetheless limited only by the following claims.

We claim:

1. A single mode optical waveguide fiber having a centerline comprising:
a core region having, a first circular segment having a center which is on the waveguide centerline, the first segment having a refractive index profile, a relative index percent, $\Delta_1$ %, and a radius, $r_1$, and a second annular segment, surrounding and in contact with the, first segment, the second segment having a refractive index profile, a relative index percent, $\Delta_2$ %, and a width, $w_2$, measured from $r_1$ outward to the intersection of the profile or the extrapolation of the profile of the second segment with the radius; and,
a clad layer, surrounding and in contact with the second segment, the clad layer having a refractive index profile, and a minimum refractive index $n_c$, at least a portion of the core region having a refractive index greater than $n_c$;
in which $\Delta_1$ % is in the range of about −0.05% to −0.60%, $\Delta_2$ % is in the range of about 0.5% to 1.6%, the reference index of the relative index percent being $n_c$, $r_1$ is in the range 1.0 $\mu$m to 5 $\mu$m, and $w_2$ is in the range of about 1 $\mu$m to 20 $\mu$m, and in which the combination of relative indexes and radii of the segments are selected to provide an effective area greater than 100 $\mu$m$^2$.

2. The single mode optical waveguide of claim 1 in which the refractive index profile of the second segment is a step index or a rounded step index, $\Delta_2$ % is in the range of about 0.6 % to 1.6%, and $w_2$ is in the range of about 1 $\mu$m to 4 $\mu$m.

3. The single mode optical waveguide of claim 2 having $\Delta_2$% in the range of 0.75% to 0.9% and $w_2$ in the range of 1.3 $\mu$m to 2 $\mu$m.

4. The single mode optical waveguide of claim 2 having $\Delta_2$ % in the range of 0.9% to 1.1% and $w_2$ in the range of 1.0 $\mu$m to 1.8 $\mu$m.

5. The single mode optical waveguide of claim 1 in which the refractive index profile of the second segment is a triangular index, $\Delta_2$ % is in the range of about 0.5% to 1.6%, and $w_2$ is in the range of about 1 $\mu$m to 20 $\mu$m.

6. The single mode optical waveguide of claim 5 having $\Delta_2$ % in the range of 1.1% to 1.4%.

7. The single mode waveguide of claim 1 in which the refractive index profile of the second segment is a trapezoid.

8. The single mode waveguide of claim 1 in which the refractive index profile of the second segment is an $\alpha$-profile.

9. The single mode waveguide of claim 1 in which the index profile of the first circular segment is selected from the group consisting of an inverted step, an inverted rounded step, an inverted triangle, an inverted trapezoid, and an inverted $\alpha$-profile.

10. The single mode waveguide of claim 1 in which the relative index of the first circular segment, $\Delta_1$ %, is in the range −0.3% to −0.5%.

11. A single mode optical waveguide fiber having a centerline comprising:
a core region having a first circular segment, having a center which is on the waveguide centerline, the first segment having a refractive index profile, a negative relative index percent, −$\Delta_1$ %, and a radius, $r_1$, and a second annular segment, surrounding and in contact with the first segment, the second segment having a refractive index profile, a relative index percent, $\Delta_2$ %, and a width, $w_2$, measured from $r_1$ outward to the intersection of the profile or the extrapolation of the profile of the second segment with the radius or the intersection of the extrapolation of the profile with the radius; and, a clad layer, surrounding and in contact with the second segment, the clad layer having a refractive index profile, and a minimum refractive index $n_c$, at least a portion of the core region having a refractive index greater than $n_c$;

in which $\Delta_1$ %, $r_1$, $\Delta_2$ %, $w_2$ and the refractive index profiles of the respective first and second segments are selected to provide an effective area greater than 100 $\mu m^2$, total dispersion slope in the range of about 0.07 ps/nm²-km to 0.10 ps/nm²-km, mode field diameter in the range of about 8 $\mu$m to 9 $\mu$m, and calculated uncabled cut off wavelength of the $LP_{11}$, mode in the range of about 1800 nm to 2000 nm.

12. The single mode waveguide of claim 11 in which the zero dispersion wavelength is in the range 1480 nm to 1530 nm.

13. The single mode waveguide of claim 11 in which the zero dispersion wavelength is in the range 1560 nm to 1600 nm.

14. The single mode waveguide of claim 11 in which the refractive index profile of the central segment is selected from the group consisting of an inverted step, an inverted rounded step an inverted triangle, an inverted trapezoid, and an inverted α-profile.

15. The single mode waveguide of claim 11 in which the refractive index profile of the second segment is selected from the group consisting of a step, a rounded step, a triangle, a trapezoid, and an α-profile.

16. A single mode optical waveguide fiber having a centerline comprising:

a core region having a first circular segment, having a center which is on the waveguide centerline, the first segment having a refractive index profile, a relative index percent, $\Delta_1$ %, and a radius, $r_1$, and a second annular segment, surrounding and in contact with the first segment, the second segment having a refractive index profile, a relative index percent, $\Delta_2$ %, and a width, $w_2$, measured from $r_1$ outward to the intersection of the profile or the extrapolation of the profile of the second segment with the radius, a third annular segment having a refractive index profile, a relative refractive index, $\Delta_3$ % and a width $w_3$; and, a clad layer, surrounding and in contact with the third segment, the clad layer having a refractive index profile, and a minimum refractive index $n_c$, at least a portion of the core region having a refractive index greater than $n_c$;

in which $\Delta_1$ % is in the range of about −0.05% to −0.60%, $\Delta_2$ % is in the range of about 0.5% to 1.6%, and $\Delta_3$ % is in the range of about −0.05% to −0.60 %, the reference index of the relative index percent being $n_c$, $r_1$ is in the range 1.0 $\mu$m to 5 $\mu$m, and $w_2$ is in the range of about 1 $\mu$m to 6 $\mu$m, and $w_3$ is in the range of about 1 $\mu$m to 20 $\mu$m and wherein the combination of relative indexes and radii of the segment are selected to provide an effective area greater than 100 $\mu m^2$.

17. The single mode waveguide of claim 16 in which the refractive index profile of the second segment is selected from the group consisting of a step, a rounded step, a triangle, a trapezoid, and an α-profile.

18. The single mode waveguide of claim 16 further including a fourth annular region similar to the second annular region and a fifth annular region similar to the third annular region.

19. The single mode waveguide of either one of claims 1 or 16 wherein, the pin array bend loss is less than 15 dB and cut off wavelength measured on the fiber is in the range 1800 nm to 2000 nm.

* * * * *